March 5, 1935.  H. F. BRAUN ET AL  1,993,357

UNIVERSAL JOINT

Filed April 11, 1933   2 Sheets-Sheet 1

INVENTORS
H. F. Braun
W. W. Slaght
BY
Evans & McLay
ATTORNEYS

March 5, 1935.  H. F. BRAUN ET AL  1,993,357

UNIVERSAL JOINT

Filed April 11, 1933    2 Sheets-Sheet 2

INVENTORS
H. F. Braun
W. W. Slaght
BY
Evans + McLey
ATTORNEYS

Patented Mar. 5, 1935

1,993,357

UNITED STATES PATENT OFFICE 1,993,357

UNIVERSAL JOINT

Herman F. Braun, Lakewood, and William W. Slaght, Rocky River, Ohio, assignors to Cleveland Steel Products Corporation, Cleveland, Ohio, a corporation of Ohio Application April 11, 1933, Serial No. 665,536

17 Claims. (Cl. 64—102)

This invention relates to universal joints for transmitting power from a driving to a driven element.

One of the objects of the present invention is to provide a universal joint of new and improved construction and improved means for mounting the bearings therein.

Another object is to provide a universal joint having readily demountable parts.

Another object is to provide a universal joint construction with improved means for locking the bearing assemblies in position.

Another object is to provide a universal joint with bearing sleeves and with improved means for preventing rotating of the same.

Another object is to provide a universal joint having a plurality of roller bearings and having bearing sleeves for housing said bearings, with new and improved means for preventing axial and rotative displacement of said sleeves, which sleeves are readily demountable.

With the above and other objects in view, which will be apparent from the following detailed description, the present invention consists in certain features of construction and combination of parts that will be readily apparent to those skilled in the art to which the invention appertains.

In the drawings, which illustrate suitable embodiments of the present invention:

Figure 1:
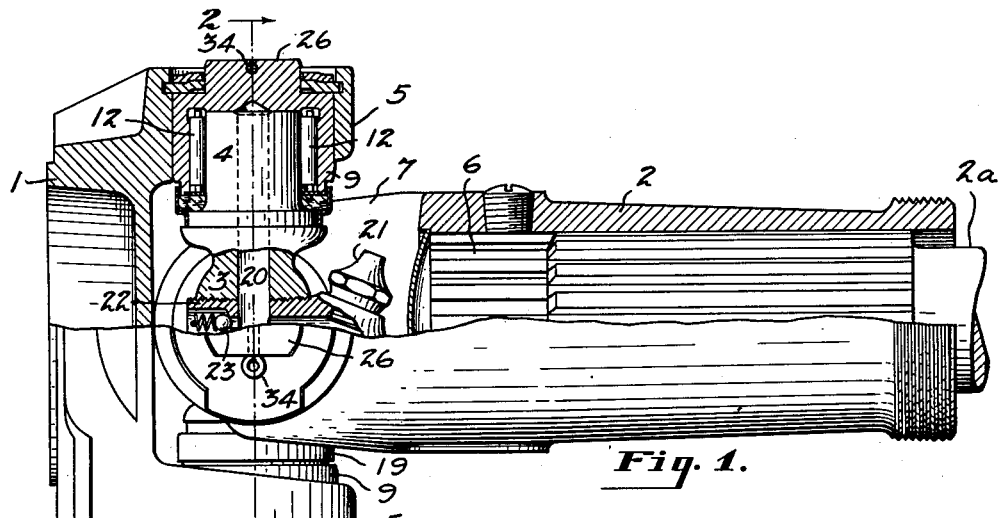
Figure 1 is a side elevation of a universal joint construction, a portion of the same being broken away and illustrated in section.

Referring to the accompanying drawings, in which like numerals refer to like parts throughout the several views, the universal joint of the present invention includes driving and driven members 1 and 2 arranged to be secured to rotating parts and a cross body 3 having radially projecting trunnions 4 journalled in the driving and driven members. As here shown, the driving member 1 is of the type arranged to be bolted to a rotating element and has opposed spaced arms 5 for journalling diametrically opposed trunnions 4 of the cross body 3, and the member 2 is tubular in form and provided with splines 6 for receiving a spline shaft 2a, and is yoked to provide arms 7 for journalling the other diametrically opposed trunnions 4 of the cross body.

Figure 3:
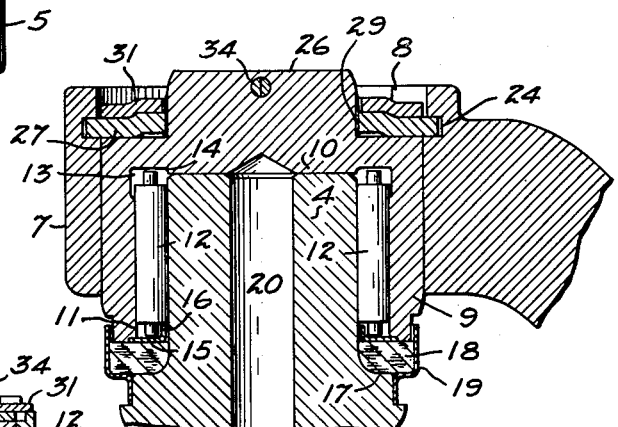
Fig. 3 is an enlarged fragmentary section taken approximately on the line 3—3 of Fig. 2.
Figure 2:
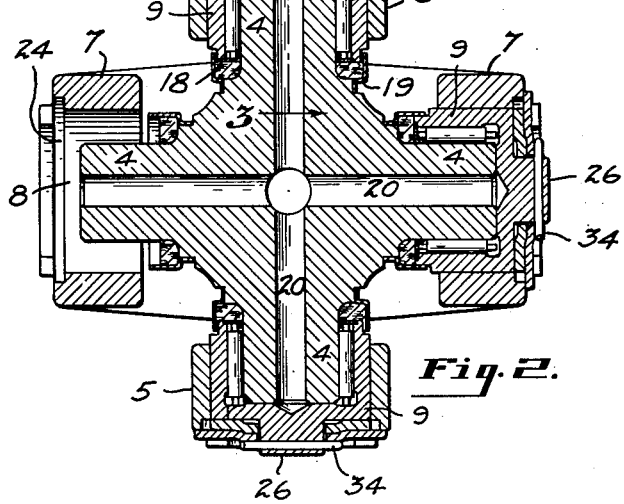
Fig. 2 is a transverse section taken approximately on the line 2—2 of Fig. 1, one of the bearing assemblies being removed therefrom.

The arms 5 and 7 of the members 1 and 2 respectively are provided with apertures 8 to receive cup-shaped bearing sleeves 9 which surround the trunnions 4 and have closed ends 10 preferably disposed to abut the ends of the trunnions 4. The internal diameter of the bearing sleeves is substantially greater than the diameter of the trunnions to provide an annular space 11 within which a plurality of small rollers 12 are disposed for journalling the trunnions 4 in the sleeves 9. The ends 10 of the sleeves are provided with annular grooves 13 to provide shoulders 14 and suitable flange plates 15 are carried by the open ends of the sleeve 9 as indicated in Fig. 3, the flanges 16 of the plates 15 and shoulders 14 cooperating to retain the rollers 12 in place when the sleeves are removed. It is to be understood, of course, that ball bearings may be substituted for the rollers or, if desired, the sleeves 9 may have direct bearing engaging with the trunnions, in which case the rollers or balls of course will be eliminated.

Furthermore, the sleeves 9 may be integrally formed as shown, or if desired the closed ends thereof may be provided by separate plates or similar closure means.

The cross body at the base of the trunnion is provided with shoulders 17 spaced from the open ends of the sleeves 9 to provide spaces for the reception of annular sealing washers 18 of felt or other suitable material. In order to further prevent the ingress of dirt and dust to the bearing surfaces, stamped metal sleeves 19 may be mounted on the cross body at the bases of the trunnions 4 to surround the open ends of the bearing sleeves 9 as shown in Fig. 3.

The cross body may also be provided with passageways 20 extending longitudinally within the trunnion and intersecting at the center of the cross body, so that lubricant may be disposed therein to flow by centrifugal force to the outer ends of the trunnions where it may work between the ends of the trunnions 4 and sleeve ends 10 to the rotating rollers 12.

A suitable lubricant fitting 21 is threaded into the central portion of the cross body so that lubricant may be introduced to the passageways 20, and in order to limit the amount of lubricant to be introduced a pressure relief fitting 22, including a spring pressed ball 23 is threaded into the opposite side of the cross body. This pressure relief fitting is provided in order that only a certain amount of lubricant can be introduced into the passageways and to avoid the discharge of lubricant from between the sleeve 9 and sealing washers 18 during the lubricant filling operation.

The present invention is primarily directed to the mounting of the bearing assemblies in the arms of the elements 1 and 2, which is accomplished in such a manner that the bearing assemblies and, therefore, the joint can be quickly and easily assembled and disassembled, which means, of course, that the bearing sleeves 9 must have a sliding fit within the walls of the arm apertures 8. In order that no wear will occur during the operation of the universal joint, between the bearing sleeves and walls of the arm apertures, it is desirable to hold these sleeves against any possible rotation. This is accomplished in the present invention by means of a simple and inexpensive locking means which will now be described.

Figure 4:
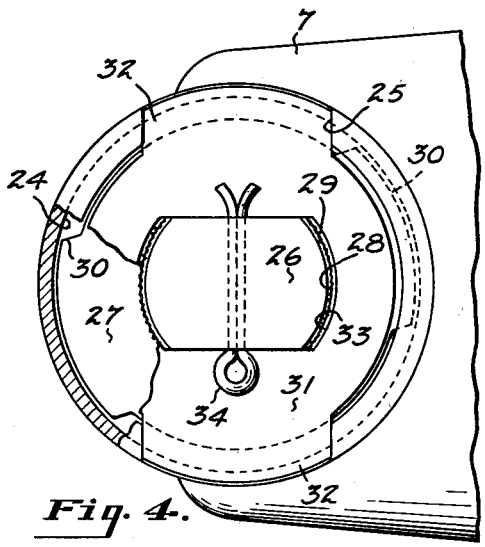
Fig. 4 is an enlarged plan view of the assembly illustrated in Fig. 3, a portion of the same being broken away and shown in section.

In the form shown in Figs. 1 to 4, inclusive, each arm of the elements 1 and 2 is formed with a circumferential groove 24 in the wall of its aperture 8 a substantial distance from one end as shown in Figs. 3 and 4. At spaced points longitudinally extending slots or recesses 25 are formed in the metal of the arm which open into the circumferential groove 24, and into the aperture. The closed end portion 10 of the sleeve 9 is provided with a central projecting lug 26 onto which a thrust plate 27 having an opening 28 corresponding to the shape of the lug 26 is forced with a press fit. If desired, however, the lug 26 may be serrated at 29 in order to insure an effective press fit engagement between the walls of the plate opening 28 and the lug as shown in Figs. 3 and 4. The plate 27 is firmly seated against the end 10 of the sleeve and is provided with radially projecting oppositely disposed fingers 30. The sleeve 9 with its assembled bearings 12 and plate 27 when such are used, is slid into the arm aperture 8 with the fingers 30 in alinement with the slot 25 until the fingers seat against the lower surface of the groove 24 as viewed in Fig. 3, and is then rotated until the fingers 30 are disposed beneath the upper wall of the groove 24, so that the fingers 30 thus will be disposed between the walls of the groove 24, which, of course, will hold the bearing sleeve against endwise movement. In this position the end of the trunnion 4 bears against the end 10 of the bearing sleeve 9, and the end thrust of the cross body will consequently be transmitted to the plate 27 to the arm in which the sleeve is disposed. Instead of employing a plate 27 it is to be understood that the finger portions thereof may be formed directly upon the bearing sleeve 9.

In order to prevent any possible turning of the bearing sleeve relative to the surrounding arms a suitable platelike member 31 is employed. This locking member 31 is formed with projecting portions 32 disposed to closely fit within the slots 25 of the arm of the joint element, and is provided with a recess 33 corresponding in shape to the lug 26 of the bearing sleeve. After the sleeve is rotated, as before stated, to lock the same against endwise movement to a position such as indicated in Figs. 3 and 4, the locking member 31 is then assembled to closely fit the lug 26, and with the projecting portions 32 closely fitting within the slots 25. It will thus be noted, as shown in Fig. 3, that the projecting portions 32 engage the sides of the slot 25 and will, therefore, lock the sleeve against any possible rotation, the plates 27 acting when the sleeve is in this position to hold the sleeve against endwise movement.

Any suitable means may be employed to hold the member 31 on the lug 26. This may be as shown in Figs. 1 to 4 in the form of a cotter pin 34 extending through the lug 26, or if desired a cap screw threaded into the end of the lug 26 may be used, the head of the screw projecting beyond the lug to hold the member 31 in position against the sleeve 9. It is preferred that the plate be bowed slightly and of resilient metal, so that it will exert some force against the cotter pin and arm to hold the plate 27 firmly against the upper wall of the groove 24 as indicated in Fig. 3.

In such a construction the assembly and disassembly of the joint parts is relatively simple and easy. For instance in disassembling the joint, it is only necessary to remove the cotter pin 34 and member 31 and rotate the sleeve until the fingers 30 thereof register with the slots 25. The sleeve can then be bodily moved longitudinally in the aperture 8 and removed. After the sleeves are removed the cross body can be easily slipped out of the apertures, since the apertures are of relatively large size and will permit sufficient movement of the cross body to allow it to be removed.

Figure 5:
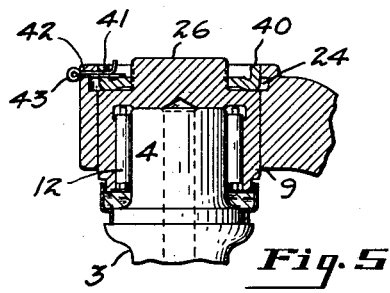
Fig. 5 is a section corresponding to Fig. 3, showing a modified form of locking the bearing assembly against rotation.
Figure 6:
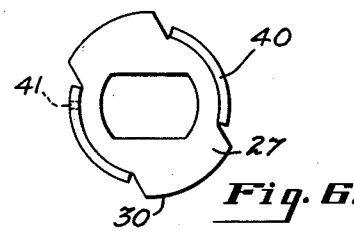
Fig. 6 is a plan view of the locking washer illustrated in Fig. 5.

In the construction shown in Figs. 5 and 6, the arrangement is the same as previously described with the exception that the locking member 31 is omitted. In this case the peripheral edges of the plate 27 intermediate the fingers 30 are flanged upwardly and one of the flanges 40 is formed with an aperture 41 which alines with an aperture 42 in the surrounding arm when the sleeve 9 is rotated to its endwise locking position. The cotter pin 43 is inserted through the openings 41 and 42 and retains the sleeve against rotation.

Figure 7:
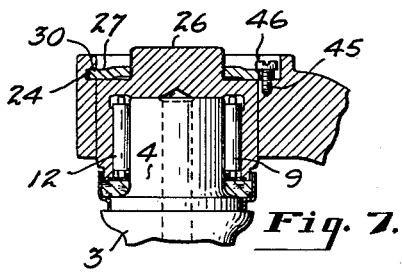
Fig. 7 is a view similar to Fig. 5, showing a further modified form of locking the bearing assembly against rotation.
Figure 8:
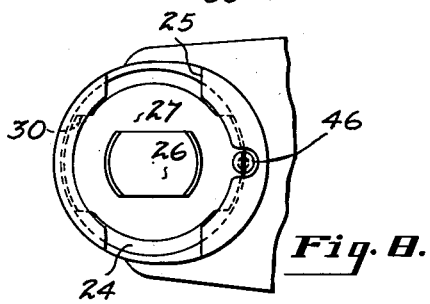
Fig. 8 is a plan view of the assembly illustrated in Fig. 7.
Figure 9:
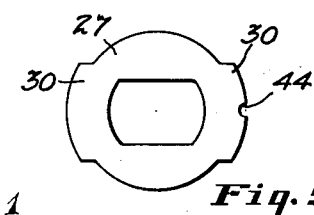
Fig. 9 is a plan view of the locking washer illustrated in Figs. 7 and 8.

In the construction shown in Figs. 7, 8 and 9, one of the fingers 30 of the plate 27 is formed with a slot 44 in its outer edge which alines with a threaded opening 45 in the arm which surrounds the sleeve 9. With the sleeve in its endwise locked position a suitable cap screw 46 may be threaded into the opening 45, the screw fitting within the slot 44 to thus prevent rotation of the plate 27 and consequently lock the bearing sleeve against rotation.

Figure 11:
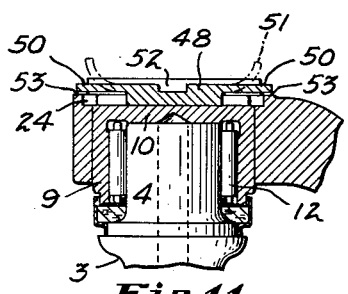
Fig. 11 is a section taken upon the line 11—11 of Fig. 10.
Figure 12:
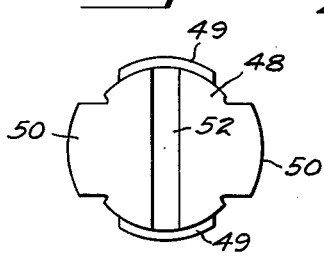
Fig. 12 is a plan view of the locking washer employed in the section shown in Figs. 10 and 11.
Figure 10:
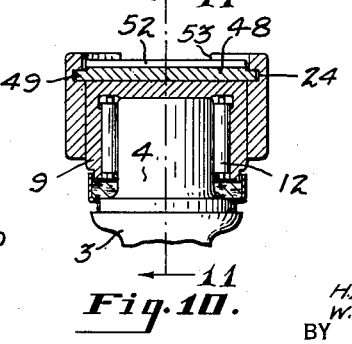
Fig. 10 is a view similar to Fig. 5, showing a further modified means for locking the bearing assembly against rotation.

In the construction shown in Figs. 10, 11 and 12, a further modified form of locking means is provided. In this case the lug 26 is omitted from the bearing sleeve 9. A plate 48 is welded or otherwise secured to the closed ends 10 of the sleeve 9. This plate has projections 49 corresponding to the fingers 30 previously described, which, when the bearing sleeve is rotated, are confined within the groove 24. Axially offset from these projections 49 are a pair of deformable fingers 50 which, when the bearing sleeve is being assembled to the yoke arm, are bent upwardly as shown at 51 in Fig. 11. A slot 52 is formed in the top of the plate 48 to permit the sleeve to be rotated to lock it against endwise movement, and then after the sleeve is rotated to its endwise locking position as shown in Fig. 10, these upwardly bent fingers are bent downwardly as shown in Fig. 11 into slots 53 in the arm to lock the bearing assembly against rotation much in the same manner as in a device shown in Figs. 1 to 4.

Although several embodiments of the invention have been herein shown and described it will be understood that numerous details of the construction shown may be altered or omitted without departing from the spirit of this invention as defined in the following claims.

What we claim is:

1. In a universal joint, a joint member, a trunnion element carried by said joint member and including oppositely disposed trunnions, a second joint member having aligned sleeve receiving apertures, each of said apertures having a circumferential groove in the wall thereof and having axial slots opening into said grooves, bearing sleeves surrounding said trunnions and having portions extending into said grooves to hold said bearing sleeves against axial movement relative to said second joint member, and means engaging said sleeves and said second joint member to hold said sleeves against rotation within said apertures, said portions being of lesser width than said slots and being movable therethrough during the insertion of said portions within said groove.

2. In a universal joint, a pair of joint members, each having a pair of spaced arms provided with aligned bearing sleeve receiving apertures, each of said apertures having a circumferential groove in the wall thereof and having axial slots in said wall opening into said groove, a cross body having radially extending trunnions, bearing sleeves surrounding said trunnions each bearing sleeve being positioned within an aperture and having radial portions projecting into the groove of the aperture to lock said sleeve against axial movement, and locking means interlocked with said bearing sleeves and arms to lock said bearing sleeves against rotational movement, said radial portions being of lesser width than said slots and being movable therethrough whereby to permit insertion of said radial portions within said groove.

3. In a universal joint, a cross body having pairs of diametrically opposed trunnions, a pair of joint members each having spaced arms provided with aligned apertures circumferentially disposed about a pair of diametrically opposed trunnions, bearing sleeves confined within said apertures and surrounding said trunnions, and means locking said bearing sleeves against axial and rotational movements relative to said apertures, each said locking means including radial interlocking tongue and groove parts on the bearing sleeve and supporting arm and means for preventing relative movement of said tongue and groove parts, said groove parts having axial slots therein to permit insertion of the tongue parts into the groove parts.

4. In a universal joint, a cross body having pairs of diametrically opposed trunnions, a pair of joint members each having spaced arms provided with aligned apertures circumferentially disposed about a pair of diametrically opposed trunnions, bearing sleeves confined within said apertures and surrounding said trunnions, and means locking said bearing sleeves against axial and rotational movements relative to said apertures, each said locking means including radial projections carried by the bearing sleeve, spaced shoulders disposed in the surrounding aperture at opposite sides of said radial projections to prevent axial movement of said sleeve, one of said shoulders having axial slots opening through the aperture to permit the disposition of said radial projections between said spaced shoulders, and a locking device holding said projections and shoulders against relative movement.

5. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said arms having a circumferential groove in the wall of its aperture and axial slots opening into said groove through one wall thereof, and means for securing said sleeves in said apertures, said means including radial tongues carried by said bearing sleeves and insertable into said grooves through said axial slots whereby upon rotation of said sleeves said tongues are confined within said grooves to lock said sleeves against axial movement, and locking means carried by said sleeves and arms to lock said sleeves and arms against relative rotational movement.

6. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said arms having a circumferential groove in the wall of its aperture and axial slots opening into said groove through one wall thereof, and means for securing said sleeves in said apertures, said means including radial tongues carried by said bearing sleeves and insertable into said grooves through said axial slots whereby upon rotation of said sleeves said tongues are confined within said grooves to lock said sleeves against axial movement, and locking members fixed on said sleeves against rotation and having projecting portions fitting within said axial slots to securely hold said sleeves against rotation relative to said arms.

7. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said arms having a circumferential grove in the wall of its aperture and axial slots opening into said groove through one wall thereof, and means for securing said sleeves in said apertures, said means including radial tongues carried by said bearing sleeves and insertable into said grooves through said axial slots whereby upon rotation of said sleeves said tongues are confined within said grooves to lock said sleeves against axial movement, and means extending into said arms in interlocking engagement with certain if said radial tongues to thereby hold said sleeves against rotation relative to said arms.

8. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said arms having a circumferential groove in the wall of its aperture and axial slots opening into said groove through one wall thereof, and means for securing said sleeves in said apertures, said means including radial tongues carried by said bearing sleeves and insertable into said grooves through said axial slots whereby upon rotation of said sleeves said tongues are confined within said grooves to lock said sleeves against axial movement, certain of said radial tongues having locking recesses therein, and screw means threaded into said arms in interlocking engagement with said locking recesses to thereby hold said sleeves against rotation relative to said arms.

9. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said arms having a circumferential groove in the wall of its aperture and axial slots opening into said groove through one wall thereof, and means for securing said sleeves in said apertures, said means including plates securely fixed on said sleeves and having radial tongues insertable into said grooves through said axial slots whereby upon rotation of said sleeves said tongues are confined within said grooves to lock said sleeves against axial movement, and locking members non-rotatably carried by said sleeves and having finger portions fitting within said axial slots to lock said bearing sleeves against rotation within said apertures.

10. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said arms having a circumferential groove in the wall of its aperture and axial slots opening into said groove through one wall thereof, and means for securing said sleeves in said apertures, said means including plates securely fixed on said sleeves and having radial tongues insertable into said grooves through said axial slots whereby upon rotation of said sleeves said tongues are confined within said grooves to lock said sleeves against axial movement, said plates also having deformable projecting finger portions disposed to be positioned within said axial slots to lock said sleeves against rotation within said apertures.

11. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said sleeves having a closed end in bearing engagement with the end of the circumscribed trunnion, each of said apertures having a circumferential groove in its wall and an axial slot in its wall opening into the groove, and means for securing said sleeves in said apertures, comprising lugs integral with the closed ends of said sleeves, locking plates non-rotatably carried by said lugs and having radial tongues insertable into said grooves through said axial slots whereby upon rotation of said sleeves said tongues are confined within said grooves to lock said sleeves against axial movement and locking means engaging said arms to lock said sleeves against rotation.

12. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said sleeves having a closed end in bearing engagement with the end of the circumscribed trunnion, each of said apertures having a circumferential groove in its wall and an axial slot in its wall opening into the groove, and means for securing said sleeves in said apertures, comprising lugs integral with the closed ends of said sleeves, locking plates non-rotatably carried by said lugs and having radial tongues insertable into said grooves through said axial slots whereby upon rotation of said sleeves said tongues are confined within said grooves to lock said sleeves against axial movement and locking members non-rotatably carried by said lugs and having finger portions fitting within said axial slots to lock said sleeves against rotation.

13. In a universal joint, a cross body having pairs of opposed trunnions, a pair of joint members, each having spaced arms provided with aligned apertures and pivotally supporting a pair of opposed trunnions, bearing sleeves fitting within said apertures and circumferentially disposed about said trunnions, each of said sleeves having a closed end in bearing engagement with the end of the circumscribed trunnion, each of said apertures having a circumferential groove in its wall and an axial slot in its wall opening into the groove, and means for securing said sleeves in said apertures, comprising lugs integral with the closed ends of said sleeves, locking plates non-rotatably carried by said lugs and having radial tongues insertable into said grooves through said axial slots whereby upon rotation of said sleeves said tongues are confined within said grooves to lock said sleeves against axial movement, locking members non-rotatably carried by said lugs and having finger portions fitting within said axial slots to lock said sleeves against rotation, and keys extending through said lugs to hold said locking members on said lugs.

14. In a universal joint, a joint cross body having pairs of opposed trunnions, a pair of joint members each having spaced arms provided with aligned apertures and pivotally supporting a pair of opposed trunnions, said arms having circumferential grooves in the walls of said apertures and axially extending slots opening into said grooves, bearing sleeves fitting within said apertures and circumferentially disposed about said trunnions, a plurality of rollers disposed between said sleeves and trunnions, fixed radial tongues projecting from said sleeves and being insertable into said grooves through said slots whereby upon rotation of said sleeves said tongues are confined within said grooves to hold said sleeves against axial movement, and means engageable with said arms to hold said sleeves against rotational movement.

15. In a universal joint, a joint cross body having pairs of opposed trunnions, a pair of joint members each having spaced arms provided with aligned apertures and pivotally supporting a pair of opposed trunnions, said arms having circumferential grooves in the walls of said apertures and axially extending slots opening into said grooves, bearing sleeves fitting within said apertures and circumferentially disposed about said trunnions, a plurality of rollers disposed between said sleeves and trunnions, locking plates securely fixed to said sleeves and having fixed radial tongues projecting from said sleeves and being insertable into said grooves through said slots whereby upon rotation of said sleeves said tongues are confined within said grooves to hold said sleeves against axial movement, and means engageable with said arms to hold said sleeves against rotational movement.

16. In a universal joint, a joint cross body having pairs of opposed trunnions, a pair of joint members each having spaced arms provided with aligned apertures and pivotally supporting a pair of opposed trunnions, said arms having circumferential grooves in the walls of said apertures and axially extending slots opening into said grooves, bearing sleeves fitting within said apertures and circumferentially disposed about said trunnions, a plurality of rollers disposed between said sleeves and trunnions, locking plates securely fixed to said sleeves and having fixed radial tongues projecting from said sleeves and being insertable into said grooves through said slots whereby upon rotation of said sleeves said tongues are confined within said grooves to hold said sleeves against axial movement, and means engageable with said arms to hold said sleeves against rotational movement, said last means including locking members securely fixed to said sleeves and having finger portions fitting within said axial slots to hold said sleeves against rotation within said apertures.

17. In a universal joint having a trunnion and a member having an aperture surrounding the trunnion in circumferentially spaced relation, means for journalling the trunnion within the aperture comprising a bearing sleeve fitting within the aperture and being circumferentially spaced from the trunnion, a plurality of small rollers in the space between said sleeve and trunnion, said aperture having a circumferential groove in its wall and opposed axial slots opening into said groove, and means securing said sleeve within the aperture, said means including opposed radial projections of lesser width than said slots carried by said sleeve and projecting into said groove, said projections being insertable into said groove through said slots, and means engaging said sleeve and member to prevent relative rotation thereof.

HERMAN F. BRAUN.
WILLIAM W. SLAGHT.